United States Patent [19]

Kodaka

[11] Patent Number: 5,122,826
[45] Date of Patent: Jun. 16, 1992

[54] FOCUSING CONTROL APPARATUS WITH ABERRATION COMPENSATION

[75] Inventor: Yoshiro Kodaka, Tokyo, Japan
[73] Assignee: Nikon Corporation, Tokyo, Japan
[21] Appl. No.: 636,138
[22] Filed: Dec. 31, 1990

[30] Foreign Application Priority Data

Jan. 12, 1990 [JP] Japan .................................... 2-5598

[51] Int. Cl.$^5$ .......................... G03B 3/00; G03B 13/18
[52] U.S. Cl. ................................. 354/402; 354/195.12; 359/707
[58] Field of Search .............. 354/402, 403, 404, 405, 354/406, 407, 408, 409, 195.1, 195.12; 350/431; 359/707

[56] References Cited

U.S. PATENT DOCUMENTS 4,768,054  8/1988  Norita et al. .................... 354/408
4,957,354  9/1990  Matsuyama .................... 350/431

Primary Examiner—W. B. Perkey
Assistant Examiner—Cassandra C. Spyrou
Attorney, Agent, or Firm—Shapiro and Shapiro

[57] ABSTRACT

A focusing control apparatus comprises a focusing information detector for detecting focusing control information regarding a focusing lens and an auxiliary lens set position detector for detecting a set position of an auxiliary lens such as a soft focus lens. A stored correction coefficient for the set position of the auxiliary lens is utilized, together with the focusing control information, in determining a drive distance of the focusing lens to achieve proper focusing. In one modification, if the auxiliary lens is manipulated and the set position thereof is changed after an in-focus state is attained in a single mode, the above process is repeated. In another modification, if the auxiliary lens is manipulated after the in-focus state is attained in the single mode, the mode is switched to a continuous mode.

6 Claims, 8 Drawing Sheets

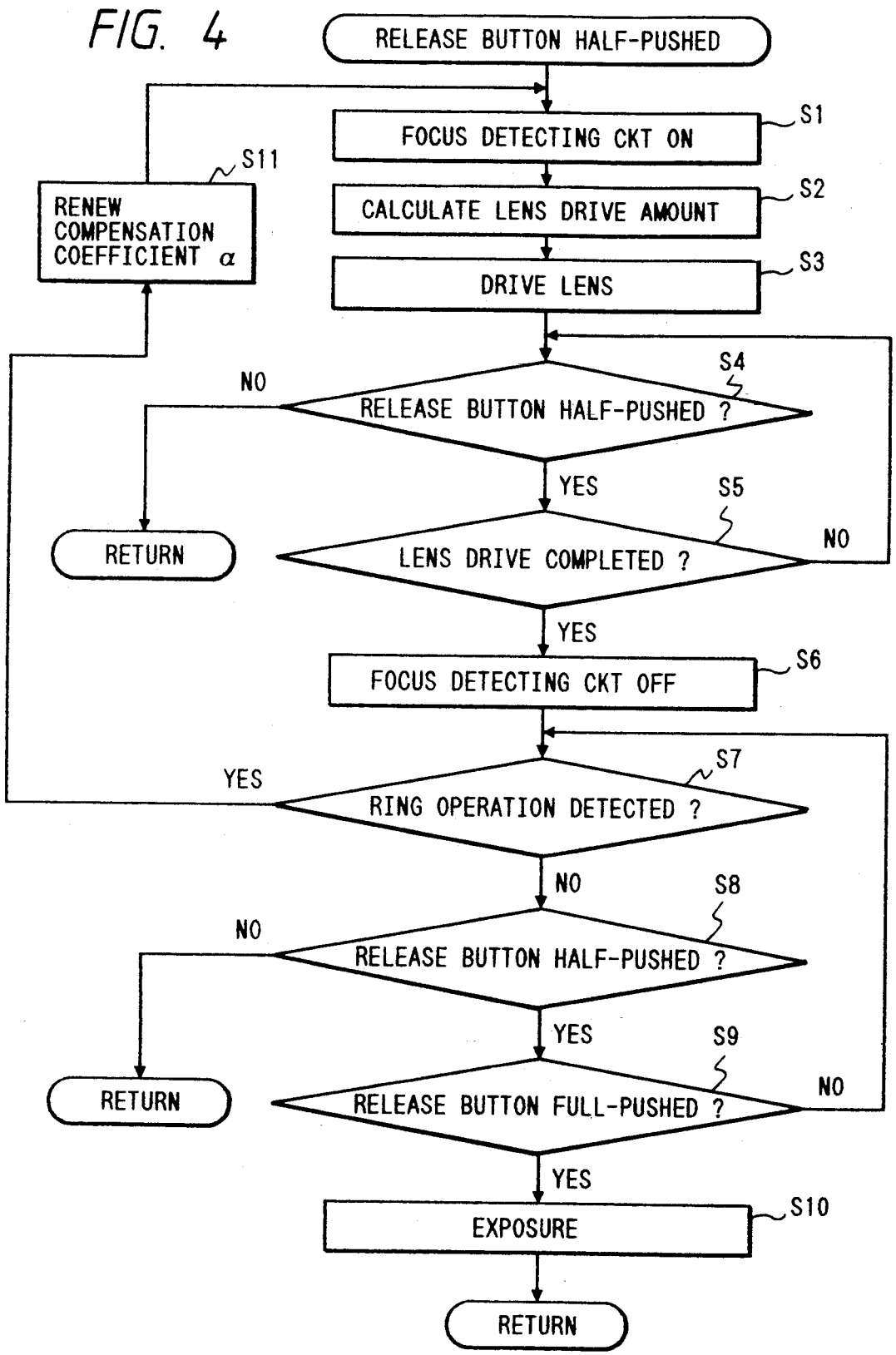

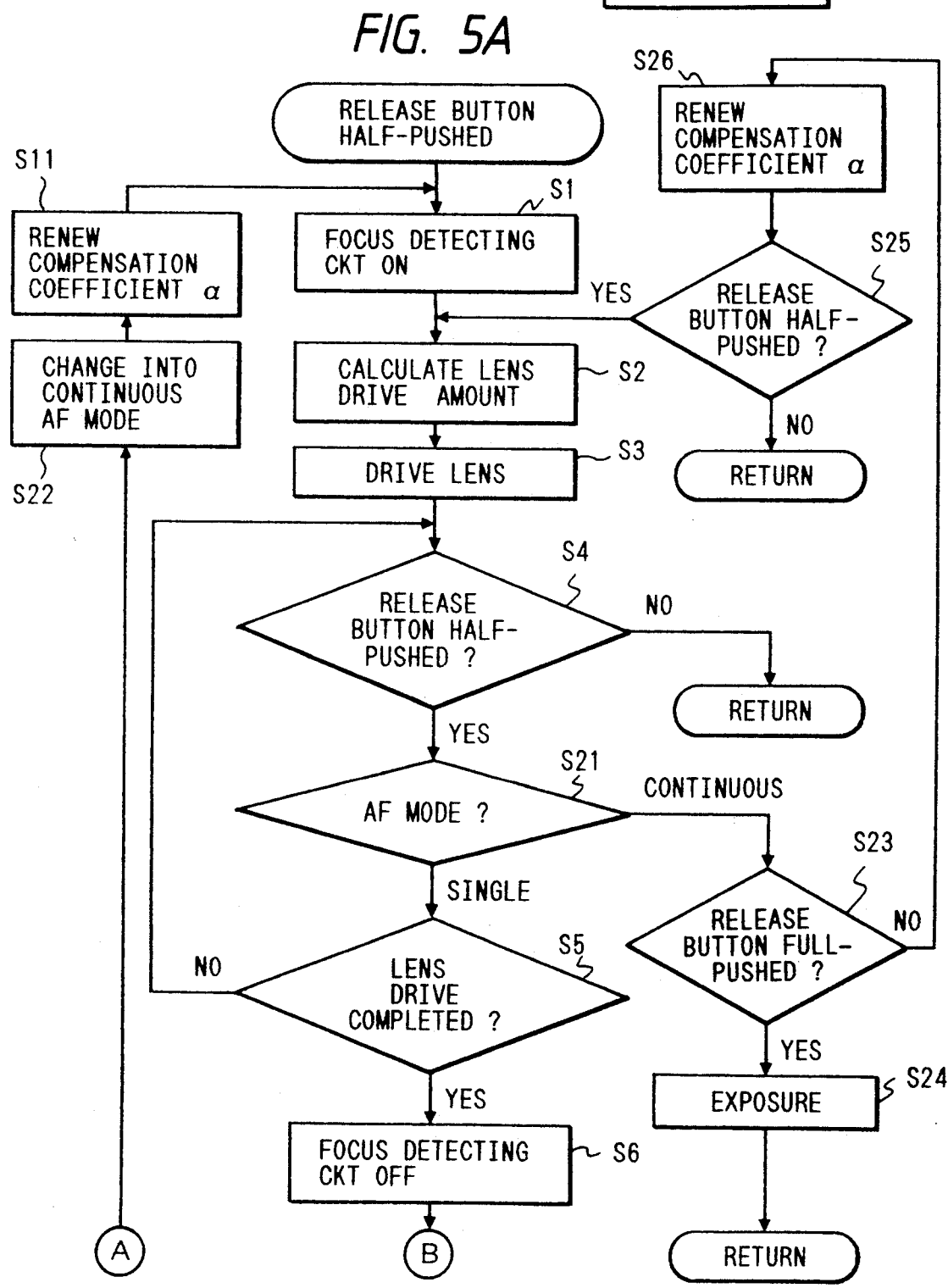

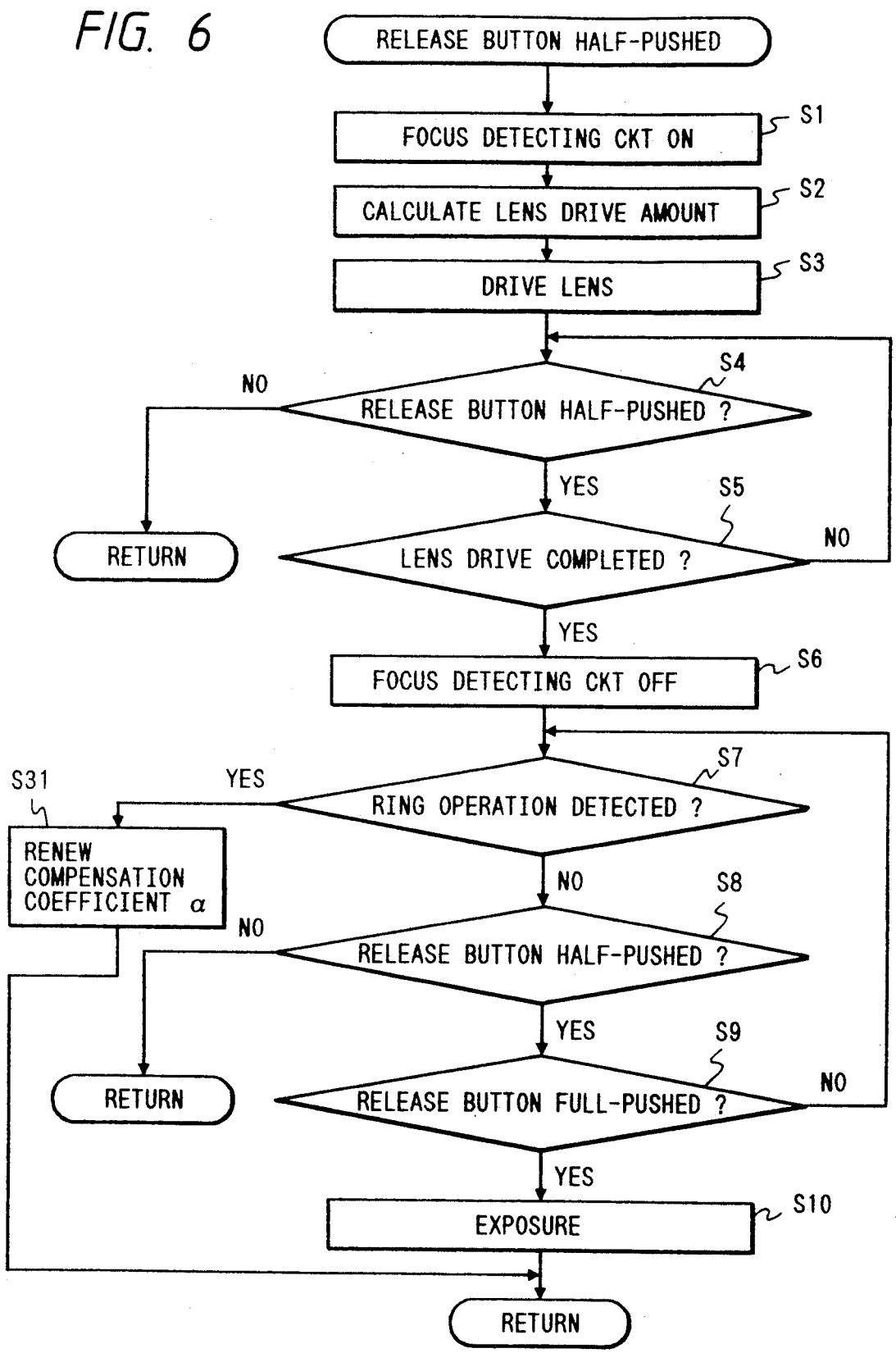

FOCUSING CONTROL APPARATUS WITH ABERRATION COMPENSATION

BACKGROUND OF THE INVENTION

1. Field of the Invention

The present invention relates to a focusing control apparatus used in a lens system in which a soft focus function for controlling a degree of soft focus as desired is incorporated in an optical system of a lens having a focus control function.

2. Related Background Art

The soft focus lens imparts a soft focus effect to a resulting photograph. The soft focus is attained with a desired degree by moving a portion of an optical system on an optical axis to change a spherical aberration.

A conventional focusing detection apparatus includes (1) a continuous mode in which focusing detection and driving of the lens into an in-focus position are always carried out during semi-depression of a shutter release button and the shutter is released irrespective of the in-focus state when the shutter release button is fully depressed, and (2) a single mode in which the focusing detection is carried out during the semi-depression and the release button is locked until the lens is driven to the in-focus position, and once the lens is in the in-focus position, the focusing detection and the lens drive are inhibited unless the release button is again semi-depressed, and the shutter is released when the release button is fully depressed in the in-focus state. Those modes may be selected as a user wishes.

When a lens system for the soft focusing is moved toward + or − on the optical axis, the focusing control information generated by the focusing control apparatus includes an error due to an affect of the spherical aberration of the soft focus lens, and accurate focusing detection and focusing control are not attained. Such an error occurs in both of the single mode and the continuous mode. This phenomenon is explained with reference to FIGS. 7 and 8.

FIG. 7 shows a change of a spherical aberration in the focusing detection optical system for light beams corresponding to F-numbers F1 and F0 with zero drive amount of the soft focus lens. FIG. 8 shows a change similar to that shown in FIG. 7 when the soft focus lens is driven by a certain amount.

As seen from FIG. 7, where the soft focusing effect is not imparted, the spherical aberration is small and an optimum image plane does not significantly change by the F-number and the effect on the focusing control precision is small. However, where the soft focus effect is imparted as shown in FIG. 8, the spherical aberration is large and the optimum image plane significantly changes with the F-number and the effect on to the focusing control precision is large. If this is neglected, it is not possible to focus the lens to a principal object.

Where the soft focus function is used in the single mode and if the lens for the soft focus is driven toward + or − while the focusing lens is in the in-focus position, the defocusing due to the soft focus effect and the shift of the optimum image plane due to the change of the spherical aberration may be observed. In order to confirm the soft focus effect, the semi-depression of the release button is once discontinued and then the release button is again semi-depressed to drive the lens into the in-focus position in order to watch the degree of the soft focus. If the degree of the soft defocusing is excessive, the above operation must be repeated. Accordingly, the operability is poor.

Further, in the single mode, if the position of the lens for the soft focus is changed after the in-focus state is attained and the release button is depressed, a photograph with a shifted optimum image plane is produced.

It may be possible to select the single mode normally and switch the mode to the continuous mode only when the soft focus lens is used. However, this would require the manipulation of the soft focus lens as well as the mode switching, resulting in poor operability.

SUMMARY OF THE INVENTION

It is an object of the present invention to prevent the reduction of the focussing precision due to the aberration of an auxiliary lens used for a function other than focusing control, such as the soft focusing lens.

Accordingly, the present invention provides a focusing control apparatus which comprises focusing information detection means for detecting focusing control information regarding a focusing lens, auxiliary lens set position detection means for detecting a set position of an auxiliary lens, such as a soft focus lens, memory means for providing a correction coefficient corresponding to the set position of the auxiliary lens, and lens drive amount calculation means for calculating a drive amount of the focusing lens based on the focusing control information and the correction coefficient.

According to one preferred form of the invention, if the auxiliary lens means is manipulated so as to change the set position thereof after an in-focus state is attained in the so-called single mode, the drive distance of the focusing lens is recalculated using updated focusing control information and an updated correction coefficient corresponding to the new set position of the auxiliary lens.

According to still another preferred form, if the auxiliary lens is manipulated after the in-focus state is attained in the single mode, the apparatus is switched to the so-called continuous mode.

Further features and advantages of the invention will be appreciated from the detailed description hereinafter together with the accompanying drawings.

BRIEF DESCRIPTION OF THE DRAWINGS

FIGS. 2 to 4 show a first embodiment of the present invention, in which:

FIG. 2A shows a top view thereof,

FIG. 2B shows a sectional view thereof,

FIG. 3 shows an overall configuration of a control system,

FIG. 4 shows a flow chart of a focusing detection process;

FIGS. 5 and 6 show flow charts of focusing detection processes in second and third embodiments, respectively.

DETAILED DESCRIPTION OF THE PREFERRED EMBODIMENTS

Figure 1A:
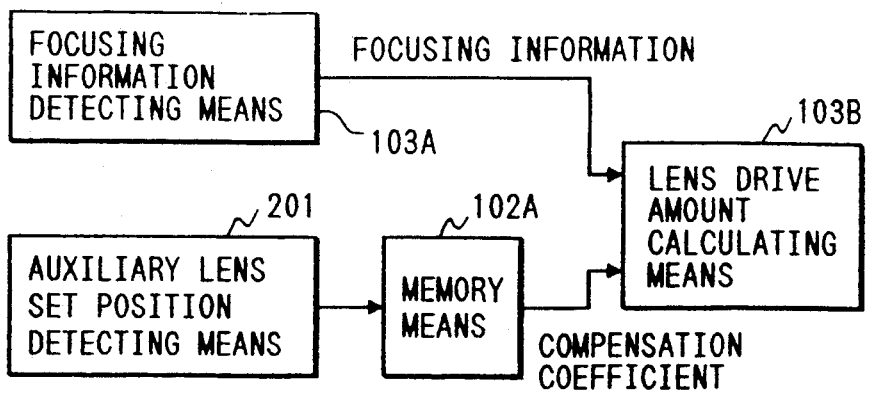
FIGS. 1A to 1C show block diagrams of several basic configurations of the present invention.
Figure 1B:
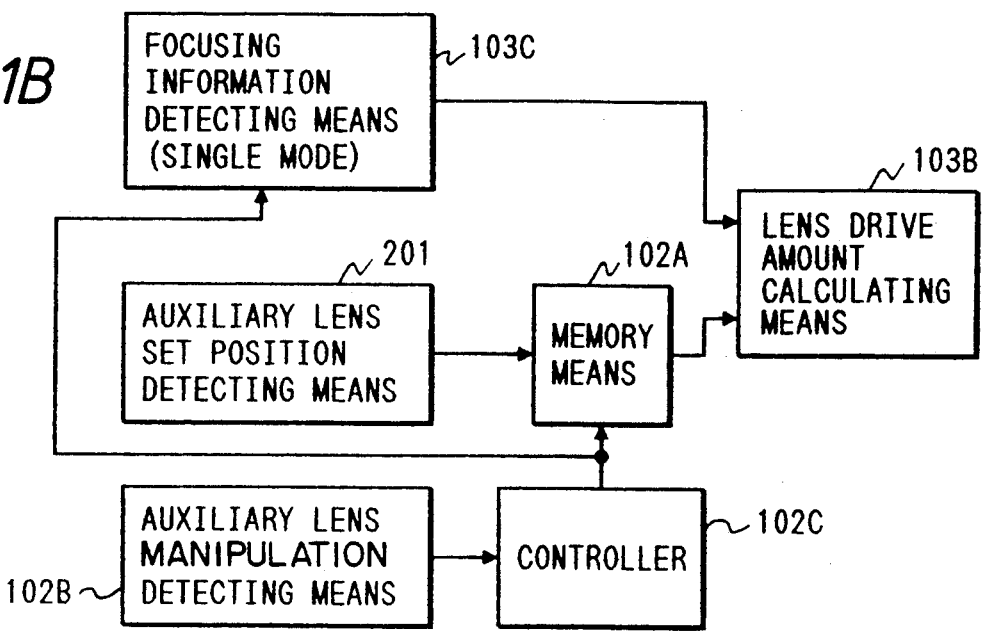
Figure 1C:
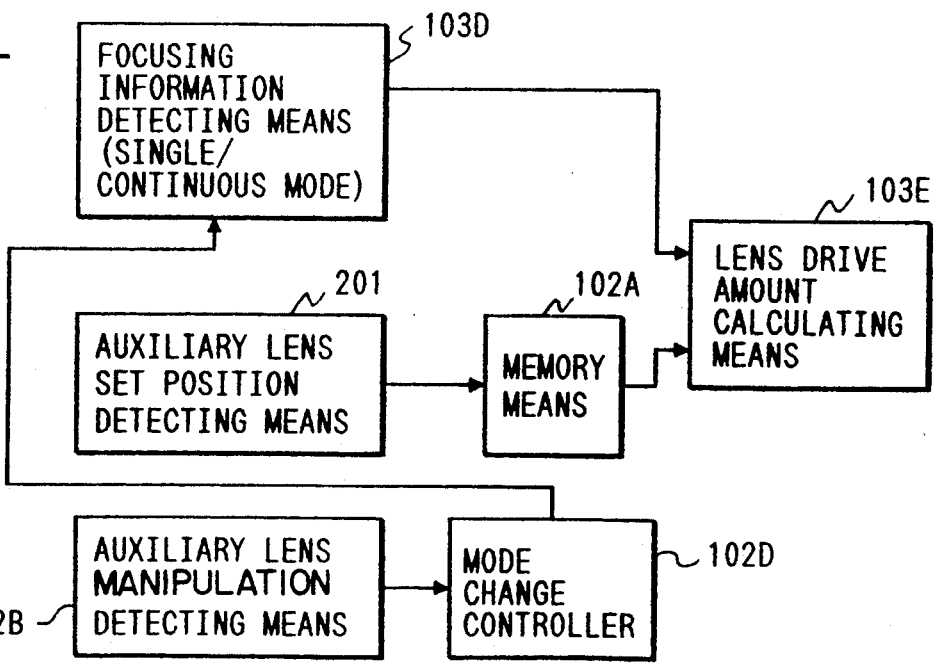

FIGS. 1A to 1C are block diagrams illustrating several basic arrangements of the present invention.

As shown in FIG. 1A, a focusing control apparatus in one aspect of the present invention comprises focusing control information detection means 103A for detecting information representing a focusing adjustment state of a focusing lens; auxiliary lens set position detection means 201 for detecting a set position of an auxiliary lens incorporated in a lens system for a function other than the focusing memory means 102A for providing a correction coefficient for the detected set position of the auxiliary lens; and lens drive amount calculation means 103 for calculating a drive amount of the focusing control lens based on the focusing information and the correction coefficient stored in the memory means 102A. Accordingly, the lens drive amount is calculated based on the correction coefficient for the current position of the auxiliary lens and the focusing control information, and the focusing control precision is not affected by the change of the aberration of the auxiliary lens.

As shown in FIG. 1B, a focusing control apparatus in a second aspect of the present invention comprises focusing control information detection means 103C for detecting information representing a focusing adjustment state of a focusing lens and operable in a single mode in which further focusing control detection is stopped after attaining an in-focus state; the auxiliary lens set position detection means 201; the memory means 102A; the lens drive amount calculation means 103B; lens manipulation detection means 102B for detecting the manipulation of the auxiliary lens after the detection of the focusing control information; and control means 102C for activating the focusing control information detection means 103C when the manipulation of the auxiliary lens is detected by the lens manipulation detection means 102B to detect new focusing control information, reading the correction coefficient from the memory means 102A and causing the lens drive amount calculation means 103B to recalculate the lens drive amount based on the focusing control information and the correction coefficient.

Accordingly, if the set position of the auxiliary lens is changed after the in-focus state in the single mode, the focusing control information detection means 103C is again activated to control the focusing. Therefore, if the auxiliary lens is a soft focus lens, it is not necessary to manually reactivate the focusing control information detection means each time the soft focus amount is changed, and the operability is improved.

As shown in FIG. 1C, a focusing control apparatus in a third aspect of the present invention comprises focusing control information detection means 103D for detecting information representing a focusing status by a focusing control lens and operable in a single mode in which further focusing control detection is stopped after an in-focus state and a continuous mode in which the focusing control detection is always effected; the auxiliary lens set position detection means 201; the memory means 102A; lens drive amount calculation means 103E for calculating a drive amount of the focusing lens based on the focusing control information and the correction coefficient read from the memory means each time the focusing control information is detected; the lens manipulation detection means 102B; and mode change means 102D for changing the mode of the focusing control information detection means 103D from the single mode to the continuous mode when the manipulation of the auxiliary lens is detected by the lens manipulation detection means 102B.

Accordingly, if the set position of the auxiliary lens is changed after the in-focus state in the single mode, the mode is switched from the single mode to the continuous mode so that the same advantage as that of the second aspect is attained.

First Embodiment

A first embodiment of the present invention is now explained in more detail with reference to FIGS. 2 to 4.

Figure 2A:
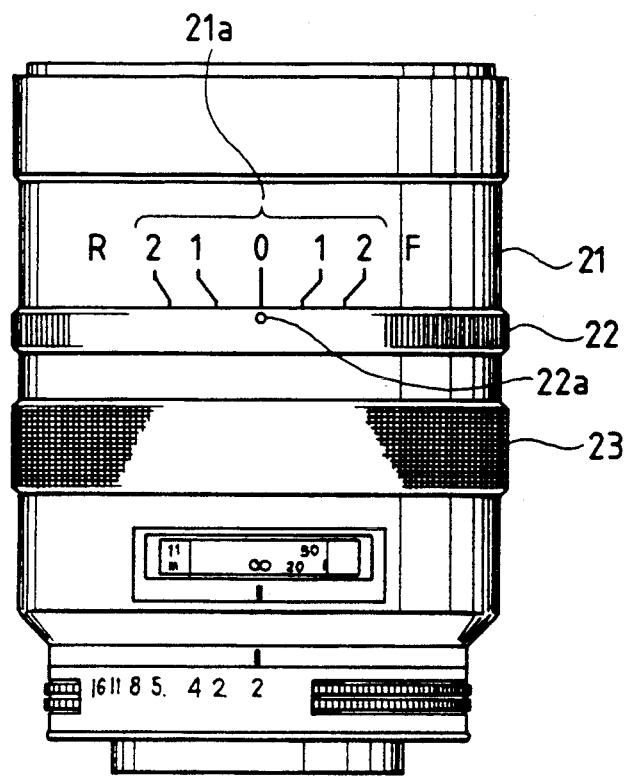
FIGS. 2A and 2B show a soft focusing lens.
Figure 2B:
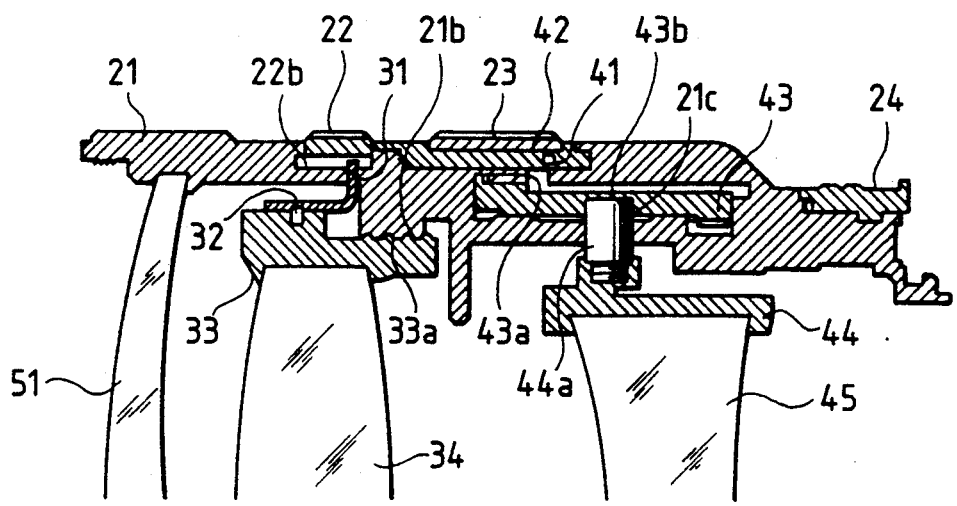

FIG. 2A shows a top view of a lens bodytube which houses a soft focus lens therein, and FIG. 2B shows a sectional view thereof. An aberration scale 21a is marked on a periphery of an outer tube 21 and a soft focus control member (hereafter referred to as an aberration control member) 22 is mounted below the scale 21a in a manner to permit circumferential rotation. The aberration control member 22 is manipulated to control the aberration of the lens, and an index 22a is provided on a surface thereof. The figures on the right hand side of an index line at the center of the scale 21a indicate abberation control amounts to attain a good near-defocusing state, and the figures on the left hand of the index line indicate aberration control amounts to attain a good far-defocusing state.

A manual focusing ring 23 for manually controlling the focus is also provided on the outer tube 21 in a manner to permit peripheral rotation.

As shown in FIG. 2B, a groove 22b extends along an optical axis in an inner peripheral surface of the aberration control member 22, and one end of a link member 31 is fitted in the groove 22b. The other end of the link member 31 is coupled to a lens hold member 33 through a bolt 32, and aberration control lenses 34 are held by the lens hold member 33. The lens hold member 33 has a helicoid 33a formed therein and the helicoid 33a meshes with a helicoid 21b formed in an inner periphery of the outer tube 21. The aberration control amount is changed by changing a distance between the lenses 34 and a lens 51 fixed to an end of the outer tube 21.

One end of a link member 42 is attached to the manual focusing ring 23 through a pin 41 and the other end of the link member 42 is fitted in a groove 43a formed in a focusing tube 43 along the optical axis. The focusing tube 43 is rotatable around the optical axis and has a cam groove 43b formed in an inner periphery thereof. Numeral 44 denotes a lens hold member for holding focusing lenses 45. A cam follower 44a extending from the lens hold member 44 engages with a linear groove 21c formed in the outer tube 21 and the cam groove 43b of the focusing tube 43.

When the manual focusing ring 23 is rotated, the focusing tube 43 is rotated through the link member 42. As the cam groove 43b is moved by the rotation of the focusing tube 43, the cam follower 44a of the lens hold member 44 is moved along the linear groove 21c of the outer tube 21 so that the focusing lenses 45 held by the lens hold member 44 are moved along the optical axis to effect focusing.

When the aberration control member 22 is rotated, the lens hold member 33 is rotated through the link member 31, and the lens hold member 33 is moved along the optical axis while it is rotated through the mesh of the helicoids 33a and 21b. As a result, a spacing between the aberration control lenses 34 and the lens 51 changes and the aberration control amount changes.

The aberration is smallest when the index 22a indicates the center index line of the scale 21a, and as the aberration control member 22 is rotated to the left or right, the aberration control amount increases so that the near-defocusing or far-defocusing is emphasized, respectively.

Figure 3:
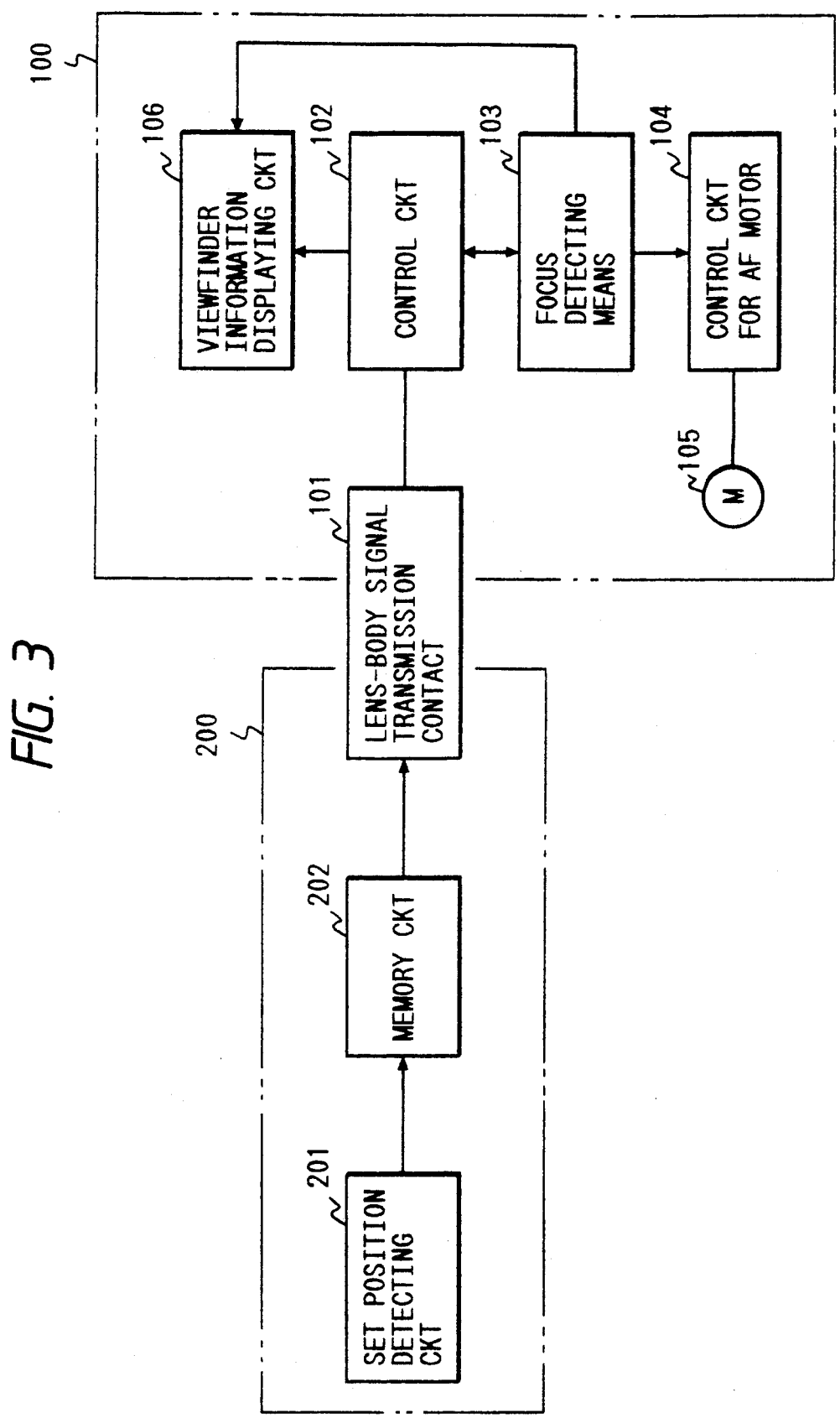

FIG. 3 shows an overall configuration of a control system. An electrical circuit in a camera body 100 is connected to an electrical circuit in an interchangeable lens 200 through contacts 101. The camera body 100 includes a control circuit 102 having a microcomputer including a CPU, a ROM and a RAM, a focusing detection circuit 103 for calculating a defocusing amount which represents a focusing adjustment state of an imaging lens in response to the reception of an object image and a lens drive amount in accordance with the defocusing amount, an AF motor control circuit 104 for controlling the drive of the lenses 45 in accordance with the lens drive amount, an AF motor 105 and a display circuit 106 for displaying the focusing control status in a finder.

The focusing detection circuit 103 can carry out the focusing detection in the single mode and the continuous mode.

The interchangeable lens 200 includes a set position detection circuit 201 for detecting the set position of the aberration control member, that is, the aberration amount, and a memory circuit 202 for storing defocusing correction coefficients in a form of map for the aberrations. The set position detection circuit 201 comprises an encoder which detects the movement of the soft focus lens hold member 33 along the optical axis. The defocusing correction coefficient read from the memory circuit 202 for the detected aberration is always sent to the control circuit 102 in the camera body 100 through the contacts 101, and the defocusing correction coefficient for the current aberration is stored in the RAM in the control circuit 102 at a predetermined timing.

FIG. 4 shows the flow of a focusing detection process which is started by the half-depression. It is assumed that the focusing detection circuit 103 has been set to the single mode.

In a step S1, the focusing detection circuit 103 is activated, and in a step S2, a lens drive amount is determined in the following manner. In a known phase difference detection system, a light beam transmitted through the imaging lens is sensed by a pair of CCD line sensors and the sensor outputs are compared to determine a defocusing amount D, that is a deviation of a focusing plane of an object from an anticipated focusing plane. A lens drive amount RS is calculated based on the defocusing amount D in the following manner:

$$RS = D \times \alpha \times K \quad (1)$$

where $\alpha$ is a correction coefficient and K is a constant given for the particular lens 200.

The correction coefficient $\alpha$ corresponds to the set position (aberration) of the soft focus lens and varies in accordance therewith. When the set position of the soft focus lens is detected by the set position detection circuit 201, the memory circuit 202 is accessed by the detection signal to read out the correction coefficient $\alpha$. The lens drive amount which is the output of the focusing detection circuit 103 is thus an amount corrected in accordance with the spherical aberration by the soft focus lens, thereby improving the focusing detection precision.

The lens drive amount RS calculated by the formula (1) is sent to the motor control circuit 104 which controls the drive of the AF motor 105 to drive the AF lenses 45 (step S3). In a step S4, if the half-depression is detected, whether the drive of the lenses 45 has been completed or not is determined in a step S5. If the drive of the lenses 45 has been completed, that is, if the lenses 45 are in an in-focus state, the focusing detection circuit 103 is deactivated in a step S6 and the subsequent focusing detection is stopped.

In a step S7, whether the set position of the aberration control member 22 has been changed or not is determined. This is done by comparing the correction coefficient $\alpha$ sent from the interchangeable lens 200 in the step S2 and stored in the RAM of the control circuit 101 and the correction coefficient $\alpha$ which is currently sent.

If the aberration by the soft focus lens has been changed, the process proceeds to a step S11 in which the correction coefficient $\alpha$ stored in the RAM of the control circuit 102 is renewed as the correction coefficient $\alpha$ which is currently supplied from the memory circuit 202 in the lens 200. Then, the process returns to the step S1.

As a result, the focusing detection circuit 103 is again activated and the focusing detection is started again in the single mode so that the lenses 45 are driven to the in-focus state.

If the decision in the step S7 is no change of aberration, the half-depression is checked in a step S8, and if the half-depression is detected, the full depression is checked in a step S9. If the full depression is detected, a film is exposed in a step S10 and the process is terminated.

In the above process, when the focusing detection circuit 103 operates in the single mode and the aberration control member 22 is manipulated so that the aberration is changed after the in-focus state attained by the half-depression and before the full depression, the focusing detection is again effected and the lens drive amount is calculated with the new correction coefficient $\alpha$. Accordingly, whenever the degree of soft focus is changed during the half-depression, the lens is precisely driven to the in-focus position and the defocused image obtained by the soft focus can be observed in a view finder. Accordingly, the camera has good operability.

When the aberration control member 22 is manipulated, the detection output of the position detection circuit 201 changes and the correction coefficient $\alpha$ from the memory circuit 202 also changes. If the correction coefficient $\alpha$ in the RAM of the control circuit 102 is always renewed into the updated output of the memory circuit 202, the step S11 is not necessary.

Second Embodiment

In the present embodiment, the focusing detection circuit 103 is operated in either the single mode or the continuous mode. If the aberration control member 22 is manipulated in the single mode after the in-focus state has been attained by the half-depression, the mode is automatically switched to the continuous mode and the focusing detection is continued.

Figure 5B:
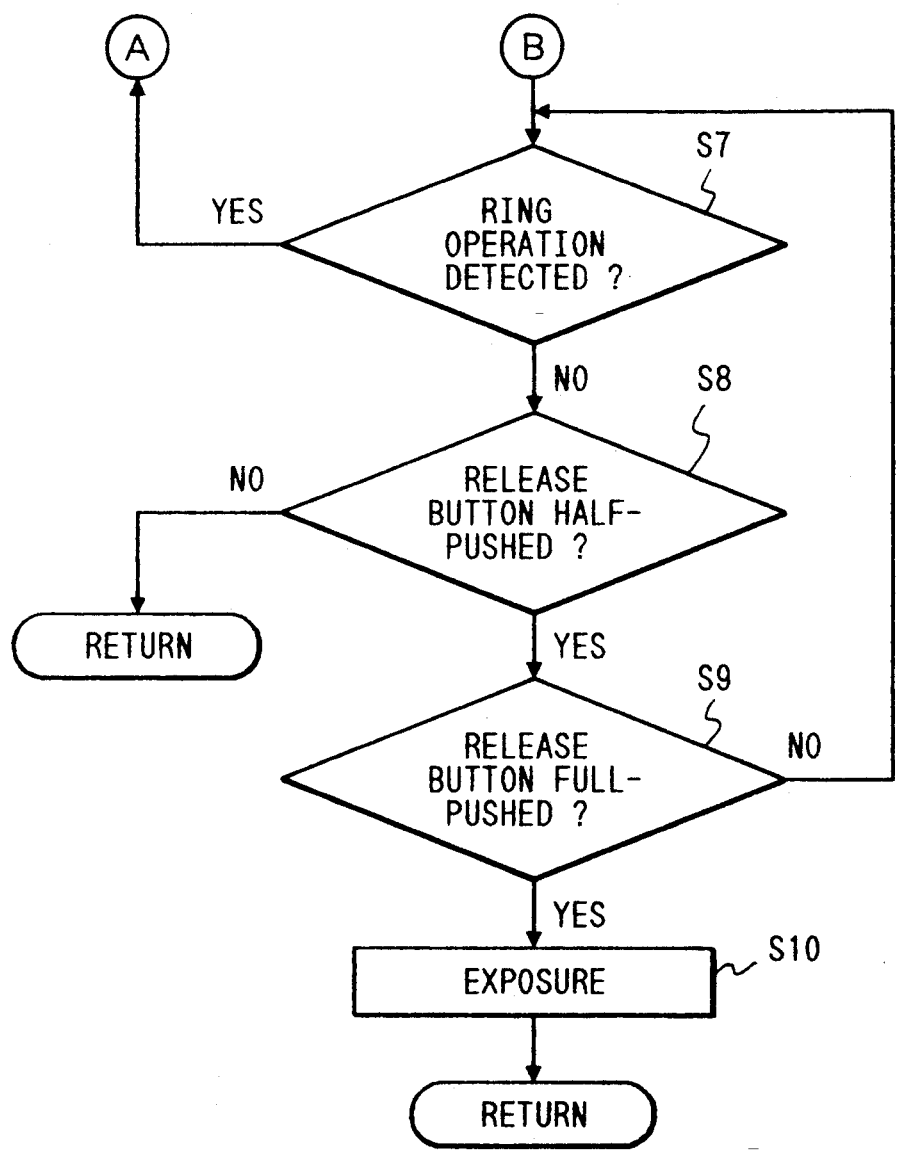
Figure 7:
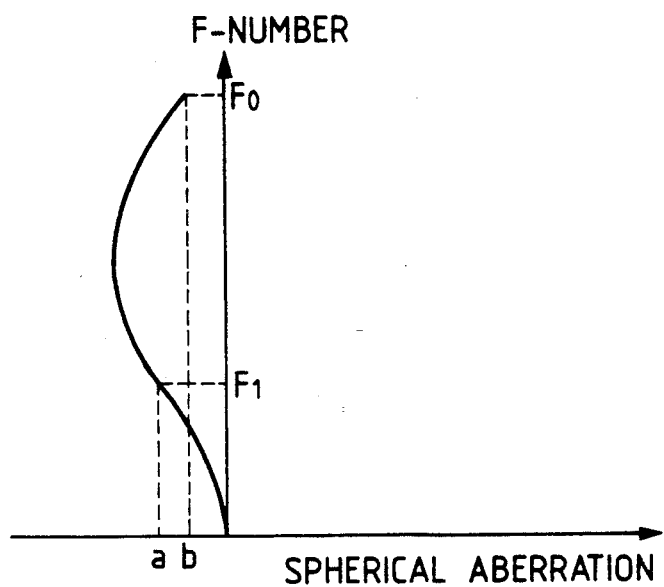
FIGS. 7 and 8 show graphs of relationships between and F-number and a spherical aberration.
Figure 8:
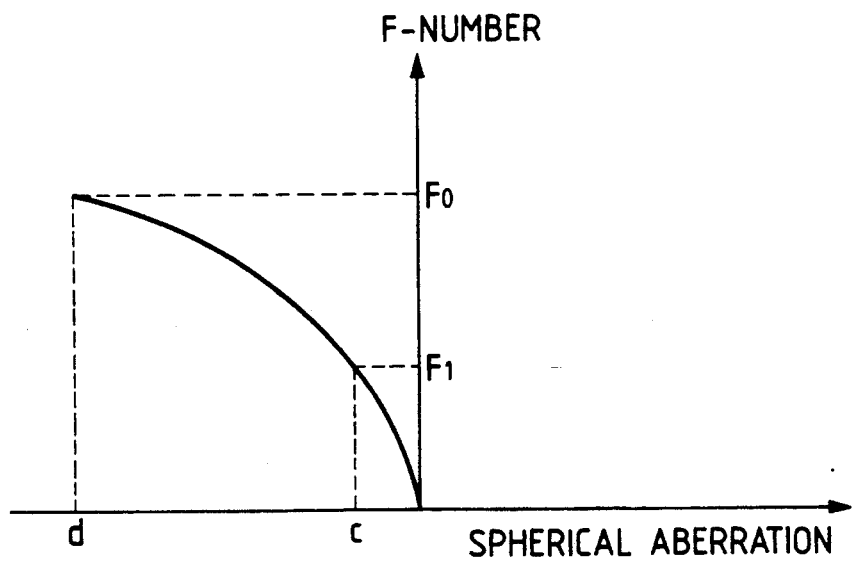

FIG. 5 shows a process thereof. The like numerals to those of FIG. 4 designate like steps. Only the differences are explained below.

In a step S21, whether the mode is the single mode or the continuous mode is determined. If it is the single mode, the steps S5, S6 and S7 which are same as those described above are executed. If the manipulation of the aberration control member 22 is detected in the step S7, the mode of the focusing detection circuit 103 is switched to the continuous mode in a step S22 and the process returns to the step S1 where the focusing detection circuit 103 is activated and the focusing detection is carried out again. The process proceeds from the step S21 to a step S23, and if the full depression is detected, the film is exposured in a step S24. If the full depression is not detected, the correction coefficient α is renewed in a step S26 and the process proceeds to a step S25 where the half depression is detected. If the half depression is detected, the process proceeds to the step S2 where the focusing detection circuit 103 again detects the focusing and calculates the lens drive amount by the formula (1) and drives the focusing lenses 45 to the in-focus state.

In accordance with the above process, if the aberration control member 22 is manipulated once the lenses 45 are in the in-focus state by the half depression, the mode is switched to the continuous mode. Subsequently, during the continued half-depression, the focusing detection is carried out and the film is exposed by the full depression even if the lenses 45 are not driven to the in-focus state.

Third Embodiment

In the present embodiment, as shown in FIG. 6, when the aberration is changed by the aberration control member 22 in the step S7, the correction coefficient α of the RAM of the control circuit 102 is renewed and the process is terminated.

If the aberration control member 22 is manipulated under the in-focus state by the half depression in the single mode, the release button is locked, so as to prevent an exposure and when the release button is again half-depressed, the focusing detection circuit 101 is activated in the step S1 to effect the focusing detection. The renewed correction co-efficient α is read in the step S2, the lens drive amount is calculated by the formula (1), the lenses are driven to the in-focus state in the steps S3 to S5, and when the full depression is detected in the step S9, the film is exposed.

In accordance with the present process, if the aberration control member 22 is manipulated under the in-focus state by the half depression in the single mode, the release button is locked and a defocused photograph due to the failure of the focusing control is prevented.

In the above embodiments, the control circuit 102 corresponds to the memory means 102A, the lens drive detection means 102B, the control means 102C and the mode change control means 102D, and the focusing detection means 103 corresponds to the focusing control information detection means 103A, 103C and 103D, and the lens drive amount calculation means 103B and 103E.

The invention has been described in connection with an interchangeable lens which includes a soft focus lens for attaining the soft focus effect. The invention is more broadly applicable, however, to prevent adverse effects on the focusing control precision by a change of aberration due to the manipulation of a lens having a function other than focusing.

Accordingly, the present invention is also applicable to a lens which includes an auxiliary lens, such as a zoom lens. The focusing detection system is, of course, not limited to a phase detection system, and the present invention is also applicable to an active distance metering system.

What is claimed is:

1. A focusing control apparatus comprising:

focusing control information detection means for detecting focusing control information corresponding to a focusing adjustment state of a focusing lens in a photographing optical system and for producing a focusing control information signal, said focusing control information detection means being operable in a single mode in which further focusing control information detection is stopped after an in-focus state is attained;

auxiliary lens set position detection means for detecting set positions of an auxiliary lens incorporated in the photographing optical system for a purpose other than focusing;

correction coefficient providing means for providing correction coefficients associated with the set positions detected by said auxiliary lens set position detection means;

calculating means for calculating a drive amount of the focusing lens based on the focusing control information signal and on a corresponding correction coefficient provided by said correction coefficient providing means;

lens manipulation detection means for detecting manipulation of said auxiliary lens after a detection by said focusing control information detection means and for producing a lens manipulation detection signal; and control means responsive to said lens manipulation detection signal for causing said focusing control information detection means to effect said detecting again and to produce an updated focusing control information signal and thereafter causing said calculating means to calculate a lens drive amount based on the updated focusing control information signal and on a correction coefficient associated with a set position to which the auxiliary lens has been manipulated.

2. An apparatus according to claim 1, wherein said correction coefficient providing means includes memory means in which a plurality of correction coefficients are stored, and wherein said correction coefficient providing means selects among said plurality of correction coefficients on the basis of the set position detected by said auxiliary lens set position detection means.

3. An apparatus according to claim 2, wherein said lens manipulation detection means compares said corresponding correction coefficient with a correction coefficient provided by said correction coefficient providing means after said detecting by said focusing control information detection means, and wherein said lens manipulation detection means produces said lens manipulation detection signal when the compared correction coefficients are different.

4. A focusing control apparatus comprising:

focusing control information detection means for detecting focusing control information corresponding to a focusing adjustment state of a focusing lens in a photographing optical system and for producing a focusing control information signal, said focusing control information detection means being operable in a single mode in which further focusing control information detection is stopped after an in-focus state is attained and a continuous mode in which the focusing control information detection is effected irrespective of the focusing adjustment state of the focusing lens;

auxiliary lens set position detection means for detecting set positions of an auxiliary lens incorporated in the photographing optical system for a purpose other than focusing;

correction coefficient providing means for providing correction coefficients associated with the set positions detected by said auxiliary lens set position detection means;

calculating means for calculating a drive amount of the focusing lens based on the focusing control information signal and on a corresponding correction coefficient provided by said correction coefficient providing means;

lens manipulation detection means for detecting manipulation of said auxiliary lens after a detection by said focusing control information detection means and for producing a lens manipulation detection signal; and mode changing means for changing the mode of said focusing control information detection means from said single mode to said continuous mode in response to said lens manipulation detection signal.

5. An apparatus according to claim 4, wherein said correction coefficient producing means has memory means in which a plurality of correction coefficients are stored, and wherein said correction coefficient providing means selects among said plurality of correction coefficients on the basis of the set position detected by said auxiliary lens set position detection means.

6. An apparatus according to claim 5, wherein said lens manipulation detection means compares said corresponding correction coefficient with a correction coefficient provided by said correction coefficient providing means after said detecting by said focusing control information detection means, and wherein said lens manipulation detection means produces said lens manipulation detection signal when the compared correction coefficients are different.

* * * * *